May 26, 1959 G. F. RADEMACHER 2,888,508
THERMOCOUPLE
Filed Feb. 11, 1957
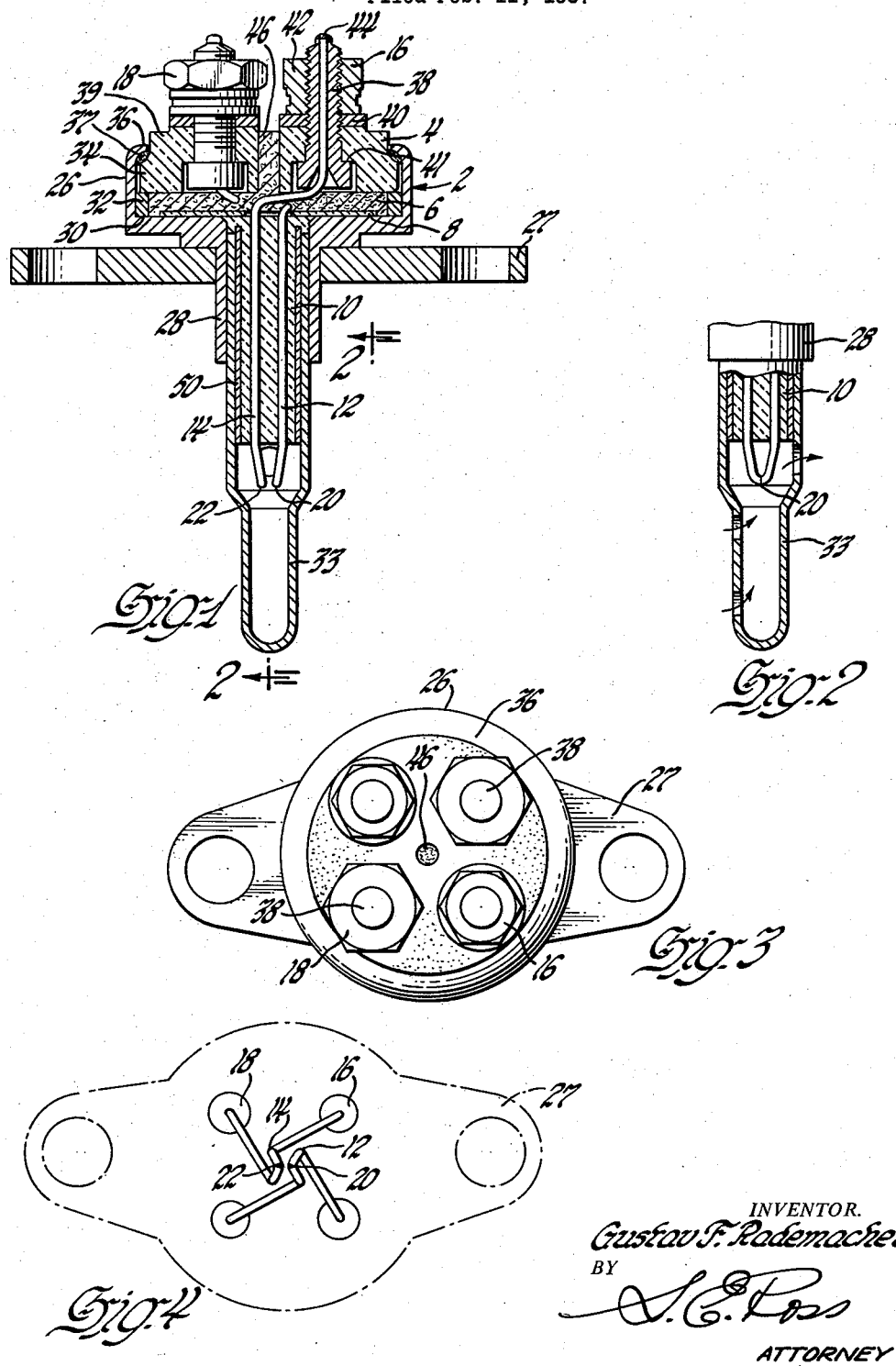
INVENTOR.
Gustav F. Rademacher
BY
ATTORNEY

United States Patent Office 2,888,508
Patented May 26, 1959

2,888,508

THERMOCOUPLE

Gustav F. Rademacher, Flint, Mich., assignor to General Motors Corporation, Detroit, Mich., a corporation of Delaware Application February 11, 1957, Serial No. 639,465

5 Claims. (Cl. 136—4)

This invention relates to thermocouples of the type used in gas turbine engines and the like and which are subject to temperatures over a wide range including extremely high temperatures. Such thermocouples are constructed with a ceramic insulator block secured within a metal housing, the insulator block in turn supporting the thermocouple wires which constitute the heat sensitive element. One of the principal difficulties encountered with this type of construction, and that to which the present invention is a solution, is that the insulator tends to become loose within the metal housing upon encountering high temperatures, this due to the inherent difference in the coefficients of expansion of the ceramic and the metal of which these elements are constructed. With the ceramic block in a loosened condition, there is no rigid support for the thermocouple wires and they are therefore subjected to repeated bendings and flexings due to vibration of the engine in which the thermocouple is installed. Thus, there may be failure due to thermocouple wire breakage after a relatively short period of operation.

It is an object of the present invention to provide an improved thermocouple having as a particularly useful characteristic greater durability and a longer useful life. In particular, it is an object of the present invention to provide a thermocouple having means for maintaining the ceramic and metal parts tightly secured together over a wide temperature range. Other objects and advantages of the invention will appear more clearly from the description which follows and from the accompanying drawings in which:

Figure 1 is a side view in section of a thermocouple embodying the invention;

Figure 2 is a section taken on the line 2—2 of Figure 1;

Figure 3 is a top view of the thermocouple shown in Figure 1; and

Figure 4 is a bottom view with parts removed of the thermocouple shown in Figure 1 and illustrating the arrangement of the thermocouple wires.

Referring now to Figure 1, the thermocouple shown comprises a metal shell or housing 2 having secured therein electrical insulator bodies 4, 6, 8 and 10 which serve to support and insulate the thermocouple wires, two of which are shown at 12 and 14. The upper ends of the wires are secured to electrical terminals, such as are shown at 16 and 18, and the lower ends extend to the exterior of insulator member 10 to form the heat sensitive junctions 20 and 22. In the particular embodiment shown, the thermocouple wires are four in number, thereby providing two separate heat sensitive junctions 20 and 22 and requiring a total of four electrical terminals, all of which are shown in Figure 3. In the thermocouple shown, two of the wires are of about 95% nickel, the remainder aluminum, silicon and manganese, each welded to one of the other two wires which are of about 80% nickel and 20% chromium. The metal housing 2 is generally cylindrical in shape, having an upper portion 26 of larger diameter and a lower portion 28 of smaller diameter, the connecting wall between said portions forming an internal annular shoulder 30. Positioned within the housing and against the shoulder 30 is a metal ring 32, to be discussed in greater detail hereinafter. A tubular metal member 33 is brazed within and forms an extension to the lower tubular portion of the metal housing 2 and is provided with gas inlet and outlet openings, as shown in Figure 2, to allow the hot gases to pass directly on contact with the heat sensitive junctions 20 and 22. This lower tubular member 33, while not essential, is advantageous in that it permits sampling of hot gases at various levels by way of the plurality of inlet openings. A suitable support flange 27 is provided in order that the thermocouple may be secured in its operating position and location, such, for example, as in the combustion chamber wall of an aircraft gas turbine engine.

The feature to which the present invention particularly relates is the arrangement of the various insulator members, and the manner of their assembly within the metal housing 2 and with the thermocouple wires and their electrical terminals. The insulator 4 is in the form of a ceramic block held tightly and securely within the upper portion 26 of the shell by means of an external annular shoulder portion 34 which is pressed between the metal ring 32 and the upper edge of the housing which forms an inwardly turned flange 36. A metal gasket 37 between the flange 36 and the insulator forms a seal between the two parts. A portion 39 of the insulator block projects out of the metal housing, this in order to provide a greater distance from the electrical terminals to the shell.

Inherently, the shell, because it is of a metal such as steel, will have a greater coefficient of heat expansion than the ceramic block and since it is the function of the ring 32 to prevent loosening of the insulator which would otherwise result because of this difference in heat expansion characteristics when the thermocouple becomes heated, the metal or metal alloy selected for the ring must have a higher coefficient of expansion than the metal from which the shell is constructed. In this connection, it is preferred that the metal ring 32 be made of bronze, the metal shell being made of steel. Also, since it is intended that the combination of the metal ring 32 and the insulator block shoulder 34 have approximately the same heat expansion characteristics (i.e., approximately the same amount of expansion over any given rise in temperature) as the upper portion 26 of metal housing 2 in which the ring and block are enclosed, the height of the metal ring 32 and of the insulator block shoulder 34 must be selected accordingly. In this connection, it should be noted that the bronze ring 32 has a height approximately equal to the height of the shoulder 34. With this combination of materials and dimensions, the greater heat expansion of the bronze ring 32 effectively compensates for the lesser expansion of the insulator block 4 so that the over-all heat expansion of the combination of the ring and insulator block substantially matches or slightly exceeds that of the metal shell in which the block and ring are enclosed. Thus the insulator block is maintained rigidly in its proper position within the shell over a very wide temperature range. When the amount of heat expansion of the ring and ceramic block in combination slightly exceeds that of the metal shell, the inherent resiliency of the bronze ring prevents excessive strain on the block and it is possible to obtain a tighter seal between the parts when they become heated than when cold.

The insulator block 4 has a total of five through-bores. One of these bores is for use in manufacture as hereinafter described, and the others are for the reception of the four electrical terminals of the thermocouple wires. Each of these terminals consists of a screw 38 provided with a lower head portion which abuts a mating internal shoulder 41 in the insulator block, a lock washer 40 threadedly engaged with the screw to secure it in place, and a terminal nut 42. The screw is provided with a through-bore through which one of the thermocouple wires extends, the top of the thermocouple wire being welded to the top of the screw, as shown at 44, thereby assuring good electrical contact. As can best be seen from Figures 1 and 4, each of the thermocouple wires at the point of leaving its terminal screw is bent inwardly and then downwardly to extend through the insulator member 10, to be joined in pairs to form the heat sensitive junctions 20 and 22, as hereinbefore described.

Positioned against the shoulder 30 of the metal shell substantially concentrically within the bronze ring 32 is the disk shaped insulator 8 having a hole in its center for passage of the two pairs of thermocouple wires. It is preferred that this insulator disk 8 be somewhat flexible, mica being especially suitable, and that it be unbonded or unconnected to the shoulder 30 or the upper surface of insulator member 10. The space between insulator block 4 and mica disk 8 is filled with a high heat resistant hardened ceramic cement which forms the insulator member 6. It is preferred that the ceramic material forming the insulator member 6 be a cement which may be forced into the assembly through the fifth opening 46 in the insulator block as a thick liquid or paste and which subsequently hardens.

The mica disk 8 serves the very important function of separating the hardened cement 6 from the insulator member 10 thereby preventing any substantial bonding between them. Thus, when extremely high temperatures are encountered, while the insulator block 4 and hardened cement 6 undergo less expansion than the shell and therefore undergo contraction relative to the shell, the stresses resulting therefrom will be localized by way of the freedom which the mica disk 8 has to withdraw upwardly and away from the shoulder 30 and the upper surface of the insulator member 10. By means of this construction, fragmentation of the hardened cement is greatly inhibited thereby further increasing the rigidity with which the thermocouple wires are maintained in their proper position.

Various ceramic compositions may be used for the different insulator members. Insulator block 4 should preferably be of a high alumina ceramic such as a ceramic containing, for example, upwards of about 85% alumina and the remainder silica and alkaline earth oxide. Insulator member 10 may, for example, be of magnesium oxide which is tightly packed around the two pairs of thermocouple wires and within a metal tube 50 to form a subassembly which can be conveniently secured, as by brazing, within the tubular member 33. Various high heat resistant cements may be used to form the insulator member 6. One such cement which may be used to advantage consists of a mixture of about 10 parts by weight of a 30% aqueous solution of phosphoric acid and 100 parts by weight of cement consisting principally of magnesium oxide, ammonium hydrogen phosphate, zircon and alumina and showing as a typical chemical analysis approximately 28% $SiO_2$, 32% $ZrO_2$, 2.5% $MgO$, 29% $Al_2O_3$, 1.7% $P_2O_5$, plus small amounts of $TiO_2$, $Fe_2O_3$, alkaline earths and alkalis.

While forming no part of the present invention, it is highly preferable that the thermocouple wires be coated with a high temperature resistant, corrosion resistant enamel. This, along with other features of the subassembly formed by the metal tube 50, packed insulator 10 and the thermocouple wires, forms the subject matter of copending United States patent application Serial No. 639,384, filed concurrently herewith in the name of Richard L. Comer.

It will be understood that various changes and modifications may be used, all within the full and intended scope of the claims which follow.

I claim:

1. A thermocouple comprising a metal housing having an inwardly extending flange at an open end thereof and an internal inwardly extending shoulder, a metal ring positioned on said shoulder, a ceramic block in said housing pressed between said flange and said ring, and a pair of thermocouple wires extending through and supported by said ceramic block, said metal ring having a greater coefficient of heat expansion than said metal housing, the heat expansion characteristics of the combination of said ceramic block and said metal ring being approximately the same as the heat expansion characteristics of said metal housing so that said ceramic block is maintained rigidly secured within said housing over a wide temperature range.

2. A thermocouple comprising a metal housing having an inwardly extending flange at an open end thereof and an internal inwardly extending shoulder, a metal ring positioned on said shoulder, a ceramic block in said housing having a shoulder portion pressed between said flange and said ring, and a pair of thermocouple wires extending through and supported by said ceramic block, said metal ring having a greater coefficient of heat expansion than said metal housing, the height of said ring and the height of said ceramic block shoulder portion being such that the heat expansion characteristics of the combination of said ceramic block shoulder portion and said metal ring are approximately the same as the heat expansion characteristics of said metal housing.

3. A thermocouple comprising a generally cylindrical steel housing having an inwardly extending flange at an open end thereof and an internal inwardly extending shoulder, a bronze ring positioned on said shoulder, a ceramic block in said housing having an annular shoulder portion pressed between said flange and said ring, and a pair of thermocouple wires extending through and supported by said ceramic block, said bronze ring having a greater coefficient of heat expansion than said steel housing and a height approximately equal to the height of the annular shoulder portion of said ceramic block so that the heat expansion characteristics of the combination of said ceramic block shoulder and said bronze ring are approximately the same as the heat expansion characteristics of said metal housing.

4. A thermocouple comprising a generally cylindrical metal housing having an upper portion of enlarged diameter with an opening defined by an inwardly extending flange at the upper end thereof, and a lower portion of reduced diameter, the wall of said housing between said upper and lower portions defining an internal annular shoulder, a metal ring positioned on said shoulder, a ceramic block pressed between said ring and said flange, insulator material within said lower portion of the housing, an insulator disk positioned concentrically within said ring and abutting said shoulder and said insulator material, a hardened ceramic cement filling the space between said ceramic block and said disk, and a pair of thermocouple wires extending through said ceramic block, said disk and said insulator material, said metal ring having a greater coefficient of heat expansion than said metal housing, the heat expansion characteristics of the combination of said ceramic block and said metal ring being approximately the same as the heat expansion characteristics of said metal housing so that said ceramic block is maintained rigidly secured within said housing over a wide temperature range.

5. A thermocouple comprising a generally cylindrical steel housing having an upper portion of enlarged diameter with an opening defined by an inwardly extending flange at the upper end thereof, and a lower portion of reduced diameter, the wall of said housing between said upper and lower portions defining an internal annular shoulder, a bronze ring positioned on said shoulder, a ceramic block having a shoulder portion pressed between said ring and said flange, a compacted powder insulator material within said lower portion of the housing, a mica disk positioned concentrically within said ring and abutting said shoulder and said insulator material, a hardened ceramic cement filling the space between said ceramic block and said disk and a pair of thermocouple wires extending through said ceramic block, said disk and said insulator material, said bronze ring having a greater coefficient of heat expansion than said steel housing, the heat expansion characteristics of the combination of said ceramic block and said bronze ring being approximately the same as the heat expansion characteristics of said metal housing so that said ceramic block is maintained rigidly secured within said housing over a wide temperature range.

References Cited in the file of this patent

UNITED STATES PATENTS

| | | |
|---|---|---|
| 2,520,016 | Ronci et al. | Aug. 22, 1950 |
| 2,611,791 | Brandau | Sept. 23, 1952 |